United States Patent
Phinney

(10) Patent No.: US 8,685,135 B2
(45) Date of Patent: Apr. 1, 2014

(54) PROCESS FOR SYNTHESIZING A COMPACTED PRODUCT

(71) Applicant: Karnalyte Resources Inc., Okotoks (CA)

(72) Inventor: Robin Phinney, Okotoks (CA)

(73) Assignee: Karnalyte Resources Inc., Okotoks, Alberta (CA)

( * ) Notice: Subject to any disclaimer, the term of this patent is extended or adjusted under 35 U.S.C. 154(b) by 0 days.

(21) Appl. No.: 13/692,470

(22) Filed: Dec. 3, 2012

(65) Prior Publication Data

US 2013/0091915 A1  Apr. 18, 2013

Related U.S. Application Data

(63) Continuation of application No. 12/539,688, filed on Aug. 12, 2009, now Pat. No. 8,323,371.

(51) Int. Cl.
*B28B 3/12* (2006.01)
*C05D 1/02* (2006.01)

(52) U.S. Cl.
USPC ...... 71/63; 264/176.1; 264/210.1; 264/210.6; 423/274; 423/499.1

(58) Field of Classification Search
USPC ........... 71/53, 63; 423/499.1, 274; 264/210.6, 264/176.1, 210.1, 118
See application file for complete search history.

(56) References Cited

U.S. PATENT DOCUMENTS

| 4,248,601 | A | * | 2/1981 | McGough et al. | 23/293 R |
|---|---|---|---|---|---|
| 4,385,920 | A | * | 5/1983 | Dancy et al. | 71/36 |
| 6,132,484 | A | * | 10/2000 | Phinney | 71/31 |
| 6,379,414 | B1 | * | 4/2002 | Kleine-Kleffmann et al. | 71/61 |
| 7,727,501 | B2 | * | 6/2010 | Ferguson et al. | 423/266 |

* cited by examiner

*Primary Examiner* — Wayne Langel
(74) *Attorney, Agent, or Firm* — Paul S. Sharpe; MBM Intellectual Property Law LLP

(57) ABSTRACT

A method forming a potassium chloride particle form potassium chloride powder having resistance to moisture absorption and shrinkage. The original feedstock comprises potassium chloride in a size distribution of 30 mesh and 100 mesh as well as a gluten based binder.

9 Claims, 1 Drawing Sheet

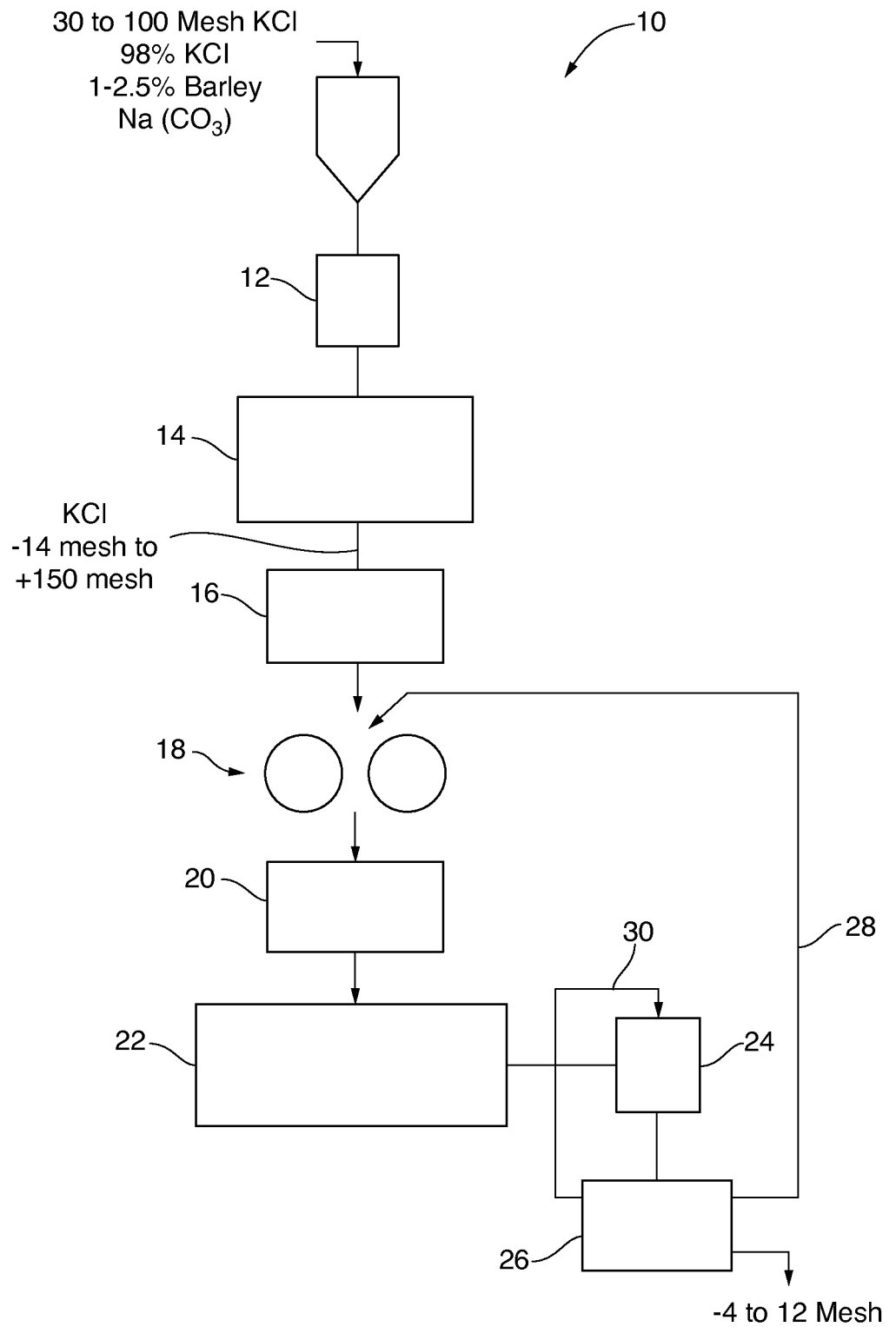

PROCESS FOR SYNTHESIZING A COMPACTED PRODUCT

CROSS-REFERENCE TO RELATED APPLICATIONS

This is a Continuation-in-Part of U.S. application Ser. No. 12/539,688 filed on Aug. 12, 2009.

FIELD OF THE INVENTION

The present invention relates to a process for synthesizing a compacted product and more particularly, the present invention relates to a process for synthesizing potassium chloride which is hygroscopically resistant and thus can be stored without particle accretion.

BACKGROUND OF THE INVENTION

As is generally known, potassium chloride occurs as sylvite. The compound is also known as muriate of potash and can be extracted from salt water. Further methodology to synthesize the compound is by crystallization from solution, electrostatic separation from suitable minerals or flotation.

Other methods for forming potassium chloride include the preparation from solid ore. The ore is exposed to solution stripping and multi-element crystallization. Generally the stripping solution from the rejected liquid, salt and water generated in processing carnallite is selectively stripped the from the solid potassium salt ore to obtain halogen liquid. The liquid is rich in potassium chloride which is subsequently crystallized.

There are innumerable other methods to achieve synthesis, however, these are typically limited in the same manner; expensive unit operations and the inability of the product to be stored without significant moisture absorption.

Kali and Salz Aktiengesellschaft patented a method for manufacturing potassium chloride having a high potassium oxide content (55 wt. %). The precursor was the fine salt resulting from the degradation of carnallite In the process alkyl amine salts are used as conditioning agents and flotation media containing magnesium and potassium chloride are used to separate this fine decomposition salt in an initial flotation stage into a grain size fraction of less than 0.1 mm as a first concentrate and a residue having a grain size of more than 0.315 mm. Subsequent to auxiliary conditioning, the residue is again floated and the potassium chloride surfaces as a second concentrate. The potassium chloride is separated from the mixture without any further conditioning in another flotation stage, and collected.

Ferguson et al., in United States Patent Publication 2005/0036929, published Feb. 17, 2005, disclose an apparatus and method for the production of a compacted potassium chloride granule Essentially, the method includes the use of sodium hexametaphosphate as a binder which is added to the potassium chloride feedstock. The binder is indicated to sequester moisture.

In U.S. Pat. No. 5,503,641, issued Apr. 2, 1996, to Bakardjiev et. al., there is disclosed a process for synthesizing potassium chloride where a multitude of unit operations are required to effect the result. Many of the operations are involved and require high energy expenditures.

Kleine-Kleffmann et al. in U.S. Pat. No. 6,379,414, teach a typical compactor circuit using a known cement of $MgCl_2$ and MgO to harden the mixture. Although the initial flake and pellets are strong, storage is poor as the $MgCl_2$ reacts with moisture in the air to form magnesium chloride hydration complexes and product quality degrades with storage in high humidity.

Dancy et al., in U.S. Pat. No. 4,385,920, provides an agglomeration process that uses a feed stock of SOP or MOP with a size distribution of −80 to +325 mesh with $H_3PO_4$ mono or diammonium phosphate with MgO to complete the cement. This is not a compaction process.

In U.S. Pat. No. 5,264,017, Van de Walle, provides an agglomeration process which uses a feed stock of −100 mesh to +325 mesh and MgO and $PO_4$ binder system. This is not a compaction system.

McGough et al., in U.S. Pat. No. 4,428,601, discloses a high grading process for removing NaCl from KCl by dissolving the NaCl in an under saturated brine of NaCl and saturated brine of KCl. This is practiced in all potash mines. The reference does not provide for compaction, agglomeration or granulation.

Having regard to the fact that potassium chloride crystals are very high energy and high stress, dendrites can form between crystals when the same are stored in conditions having relative humidity of greater than approximately 70%. In this manner, the material must be purchased and immediately used in order to avoid particle accretion.

It would be desirable to have a process where the unit operations were minimized with a low energy requirement with the resulting product being resistant to moisture absorption.

The present invention satisfies these goals.

SUMMARY OF THE INVENTION

One object of one embodiment of the present invention is to provide an improved process for synthesizing potassium chloride.

A further object of one embodiment of the present invention is to provide a method for synthesizing a compacted potassium chloride fertilizer product, comprising: providing a source of potassium chloride in a size distribution of between 30 mesh and 100 mesh; pulverizing a mixture of said source of potassium chloride in the presence of a binder, said binder being a grain type binder present in an amount between 0.5% to 2.5% by weight; said potassium chloride being present in an amount of not more than 8% by weight; mixing the pulverized mixture with potassium chloride in a size distribution of −14 mesh to +150 mesh; introducing at least one of sodium carbonate and sodium bicarbonate in an amount of between 0.01 to 0.5% by weight to said mixture to avoid formation of magnesium chloride hydration complexes; feeding the pulverized mixture to a counter rotating roller system and squeezing the mixture at a pressure of between 1000 and 2000 psi to homogenously distribute said binder and said potassium chloride into flakes in a roll or impact crusher; drying said flakes; and crushing said flakes to yield a product in a size distribution of between 4 mesh and 12 mesh in a yield of up to 70%.

It has been found that the use of a grain type binder is particularly effective in inhibiting moisture absorption into the pellets or granules. The mechanism is not precisely known, however when the binder is commingled with the potassium chloride, the final results are favourable. Barley is an example that has been found useful.

By making use of the sodium bicarbonate and/or sodium carbonate, magnesium chloride hydration complex formation is obviated. This contributes to longer term storage, while maintaining flowability. It may also be useful to substitute the sodium compounds for equivalent amounts of potassium carbonate and/or potassium bicarbonate.

Another object of one embodiment of the present invention is to provide a potassium chloride granule synthesized in accordance with the methodology as set forth in claim 1.

There are distinct advantages to the procedure set forth herein. The individual steps are important, namely providing the potassium chloride in the specified size distribution of between 30 mesh and 100 mesh as well as pulverizing a mixture of the potassium chloride in the size distribution noted in the presence of a binder. It is important to elucidate the compaction step with respect to the prior art and the instantly claimed invention. It has been found that the compaction effectively consolidates, in a homogenous manner for homogenous distribution, the binder and the potassium chloride into the flakes. This consolidation by the specified procedure results in uniform distribution of the potassium chloride which is an important factor for farmers employing the fertilizer.

It has been found that by making use of a roll crusher a significant increase in the yield of the product can be achieved. The size and operating parameters will be appreciated by one skilled. As an alternative, the crusher may be an impact crusher.

Having thus generally described the invention, reference will now be made to the accompanying drawings illustrating preferred embodiments.

BRIEF DESCRIPTION OF THE DRAWING

The FIGURE is a schematic illustration of the process according to one embodiment of the present invention.

DETAILED DESCRIPTION OF THE PREFERRED EMBODIMENTS

The FIGURE shown is representative of the overall process, globally denoted by numeral 10. Initially, potassium chloride in a size distribution of between 30 mesh and 100 mesh containing 98% potassium chloride is fed commonly with binder material into a suitable pulverizer 14 via feeder 12. Sodium bicarbonate and/or potassium bicarbonate is an amount of between 0.01% and 0.5% is added to prevent hydration of $MgCl_2$ to magnesium chloride hydration complexes. Potassium carbonate compounds may be substituted for the sodium compounds. This addition prevents clumping to maintain flowability.

With respect to the binder, suitable examples include the grain type which are gluten containing. Examples are well known to those skilled. It has been found that binder in an amount from between 0.5% and 2.5% by weight is effective. At this point, larger potassium chloride crystals, i.e. those in a size distribution of −14 mesh to +150 mesh may be added. In situations where the binder is deficient any moisture, water may be added at 16 in an amount of between 0.1% by weight and 1.0% by weight. The mixing is conducted at a temperature of between 70 and 120° C. If the mixing occurs between 70° C., the residence time in the mixer is longer than that for temperatures above 70° C.

The newly formed feed material is then fed to a counter rotating roller system 18 and is squeezed at approximately a range of between 1000 psi and 2000 psi. This is 20% of the force provided by a typical compactor. The use of the rollers 16 is useful to consolidate the material, i.e. the binder and potassium chloride to be homogenously distributed into flakes. This is in marked contrast with compactor systems which have a proclivity towards non uniform dispersion of the potassium and binder within the compacted product. This obviously has ramifications in terms of efficacy of the final product, since potassium concentrations could vary widely.

The flaked product is then passed on to a flake breaker 20 which breaks the flakes into smaller shapes (not shown) of typically a size between −¼ inch to +½ inch. The flakes are then transferred to a dryer 22 to get the moisture content to about 0.1% by weight and subsequently to a roll crusher 24. The latter may also be replaced by an impact crusher (not shown) in order to generate a final product in a size distribution of between −4 mesh and 12 mesh subsequent to screening at 26. Oversized particles may be recycled to the roll crusher 24 via line 30. Undersized particles may be recycled to rollers 18 via line 28.

Observing the noted protocol results in a yield of approximately 60% to 70% of the size distribution noted, the final product having reduced hygroscopicity relative to particle formed by alternative processes in the prior art.

Where an impact mill was employed for the crushing operation, the size distribution of between −4 mesh and 12 mesh was produced in a yield of approximately 30% to 40% Accordingly, the roll crusher has a significant effect on the final yield of the product.

By making use of fine potassium chloride in synthesizing the particle, moisture damage in terms of inducing clumping and/or particle or granular accretion is avoided. This has the distinct advantage of resulting in an inherently more stable product which remains intact as granulated in terms of size and flowability. The surface layer of the granule has been found to withstand up to 1% moisture without degradation. Upon a reduction in relative humidity to daytime levels, i.e. below 40%, the layer dries thus restoring the product to its original state.

Under conventional methods of formation, the product is sold as "distressed" and re-screened to obtain product which is useable. This inconvenience is further exacerbated by the fact that when the product is warehoused, shrinkage of the order of between 2% and 5% is commonplace. These inconveniences are simply accepted in the art and add additional cost for processing. In marked contrast, the instant technology provides for higher yields and resistance to moisture damage.

Although embodiments of the invention have been described above, it is limited thereto and it will be apparent to those skilled in the art that numerous modifications from part of the present invention insofar as they do not depart from the spirit, nature and scope of the claimed and described invention.

I claim:

1. A method for synthesizing a compacted potassium chloride fertilizer product, comprising:
   providing a source of potassium chloride in a size distribution of between 30 mesh and 100 mesh;
   pulverizing a mixture of said source of potassium chloride in the presence of a binder, said binder being a grain type binder present in an amount between 0.5% to 2.5% by weight; said potassium chloride being present in a amount of not more than 8% by weight;
   mixing the pulverized mixture with potassium chloride in a size distribution of −14 mesh to +150 mesh;
   introducing a compound selected from the group consisting of sodium carbonate and sodium bicarbonate in an amount of between 0.01 to 0.5% by weight to said pulverized mixture to avoid formation of magnesium chloride hydration complexes;
   feeding said pulverized mixture containing said binder, said potassium chloride and said sodium carbonate or sodium bicarbonate to a counter rotating roller system and squeezing said mixture at a pressure of between 1000 and 2000 psi to homogenously distribute said binder and said potassium chloride into flakes in a roll or impact crusher;

drying said flakes; and crushing said flakes to yield a product in a size distribution of between 4 mesh and 12 mesh in a yield of up to 70%.

2. The method as set forth in claim 1, wherein a source of water is added to said mixture in an amount from between 0.1% by weight and 1.0% by weight.

3. The method as set forth in claim 1, wherein mixing is performed at a temperature of between 70° C. and 120° C.

4. The method as set forth in claim 1, said mixing is conducted at a temperature of less than 70° C. with greater residence time in the mixer for said mixture relative to that when the temperature is above 70° C.

5. The method as set forth in claim 1, wherein crushing is performed using a roll crusher.

6. The method as set forth in claim 1, wherein crushing is performed using an impact crusher.

7. The method as set forth in claim 1, wherein crushed flakes are screened with screen means.

8. The method as set forth in claim 1, wherein oversized crushed particles are recycled to undergo additional crushing.

9. The method as set forth in claim 1, wherein at least a portion of screened material is recycled for compaction.

* * * * *